Aug. 20, 1968 F. S. ROACH 3,397,595

LOCKING DIFFERENTIAL

Filed March 25, 1966 2 Sheets-Sheet 1

INVENTOR.
Francis S. Roach
BY Pendleton, Neuman,
Seibold & Williams
Attorneys

Aug. 20, 1968  F. S. ROACH  3,397,595
LOCKING DIFFERENTIAL
Filed March 25, 1966  2 Sheets-Sheet 2
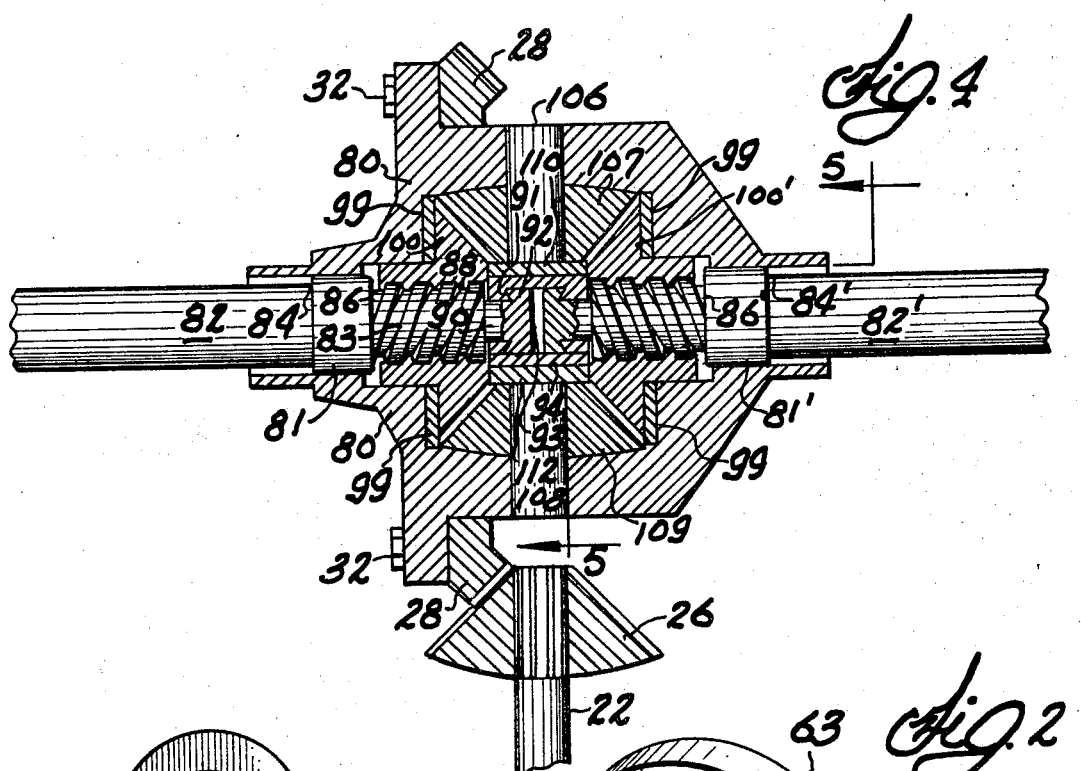
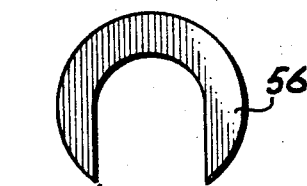
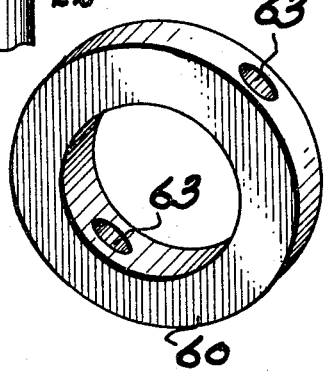
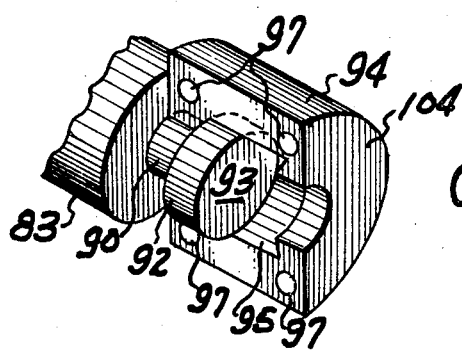
INVENTOR.
Francis S. Roach
BY Pendleton, Neuman,
Seibold & Williams
Attorneys

United States Patent Office 3,397,595
Patented Aug. 20, 1968

3,397,595
LOCKING DIFFERENTIAL
Francis S. Roach, 628 Lincoln Blvd.,
Freeport, Ill. 61032
Filed Mar. 25, 1966, Ser. No. 537,402
15 Claims. (Cl. 74—710.5)

ABSTRACT OF THE DISCLOSURE

This disclosure relates to a differential of the spider gear type. The bevel gears are threadably mounted on their respective axles, so that the axles and bevel gears may move axially with respect to each other. The differential is locked in one embodiment, in one mode of operation, by urging the axles inwardly into engagement with a centrally located stop block, while the bevel gears are urged outwardly. In the reverse mode of operation, the lock arises by urging the axles outwardly so that collars on the axles engage the differential case. In either mode of operation the lock is released by differentiating action in which one axle is driven, by its wheel, faster than the other. In another embodiment, the stop block is omitted; the inner ends of the axles are urged together to produce a lock in one mode of operation, and the lock in the reverse mode of operation arises by urging the axles outwardly, so that the inner sides of flanges provided on the inner ends of the axles engage portions of a clamp mechanism surrounding the flanges.

---

This invention relates to locking differentials, and more particularly to differentials which are adapted to normally lock a pair of driven wheel axles together, and to release such lock when the axles are differentiating.

Many attempts have been made in the prior art to provide locking differentials, especially for automobiles, where, when one wheel loses traction on ice, mud, or the like, very little power is applied to the wheel having traction. Most of the power transmitted by ordinary differentials goes to spin the wheel having the lesser traction.

In many of the prior art locking differentials, means are provided to sense a relative angular rotation of the two wheel axles, and apply a torque to restrain such rotation. Such devices cannot discriminate, however, between loss of traction and sharp corners at moderate or high speeds, so that the main purpose of the differential, viz, to allow for differentiating, is at least partially defeated. In addition, such differentials cannot be effectively employed on farm tractors and the like where turning is customarily accomplished by applying a braking torque to one of the wheels, which determines a pivot point for the vehicle to swing around. This operation would cause the prior art differentials of this type to lock, thus hampering the turning.

Accordingly, it is an object of the present invention to provide a locking differential which is adapted to be normally locked, with means to unlock it when differentiating.

Another object of the present invention is to provide a locking differential which may be employed in a vehicle system designed to use braking power for turning.

A further object of the present invention is to provide a locking differential of about the same size as an ordinary spider differential, without requiring larger housings, larger gears, or a different arrangement of parts.

Another object of the present invention is to provide a locking mechanism for a differential which can be employed with an ordinary spider differential, the latter being easily modified to incorporate the locking feature of the present invention.

These and other objects and advantages of the present invention will become manifest upon an inspection of the following description and the accompanying drawings.

In one embodiment of the present invention there is provided a differential case supporting a shaft having a pair of compensating pinions, a pair of wheel axles, and a bevel gear threadably mounted on each wheel axle. A stop block is mounted on the pinion shaft between the pinions.

In another embodiment, there is provided a differential having a differential case supporting a pair of shafts, each with a compensating pinion, a pair of wheel axles, and a bevel gear threaded on each wheel axle. The axles are each provided with annular grooves near their inner ends, and a pair of clamp members are arranged to cooperate with the grooves to limit the outward motion of the axles.

Reference will now be made to the accompanying drawings in which:

FIG. 2 is a perspective view of one of a pair of collars employed with the apparatus illustrated in FIG. 1;

FIG. 3 is a plan view of one of a pair of C-rings employed with the apparatus illustrated in FIG. 1;

FIG. 4 is a horizontal cross-sectional view illustrating an alternative embodiment of the present invention;

FIG. 6 is a perspective view of one of a pair of housing members employed with the embodiment illustrated in FIG. 5.

Figure 1:
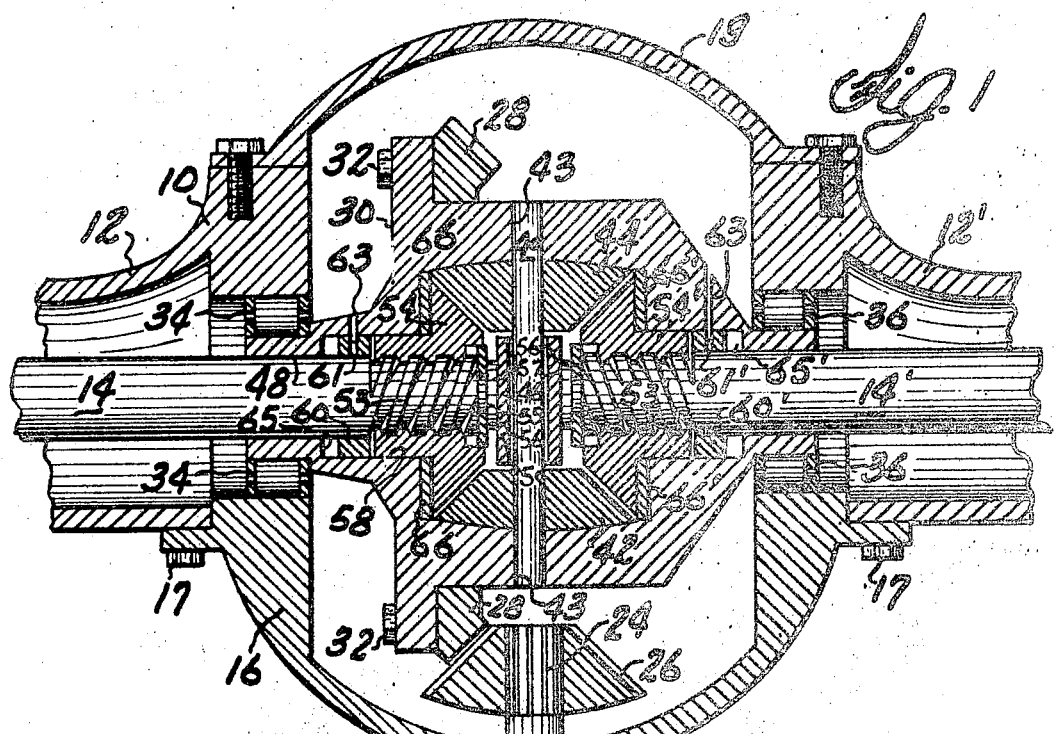
FIG. 1 is a horizontal cross-sectional view, shown partly in full line, of a complete differential embodying the present invention.

Referring now to FIG. 1, there is illustrated a differential assembly having an outer housing 10 connected on one side to a tubular axle housing 12 within which a wheel axle 14 is mounted, and on the other side to a similar axle housing 12' enclosing a similar axle 14'. Bolted to the axle housing 12 is a cover 16, which is removably mounted on one side of the housing 10 by means of bolts 17. A rear cover 19 is also removably connected to the housing. The cover 16 is provided with an aperture 18 having a bearing 20 supporting the drive shaft 22 of the motor vehicle. The shaft 22 is provided with splines 24 by which the shaft is connected to a driving pinion 26. The driving pinion 26 cooperates with the teeth of a ring gear 28 bolted to a differential case 30 by bolts 32. A pair of bearings 34 and 36 are provided between the differential case 30 and the housings 10 and 16, so that the differential case 30 may be supported by, and be rotated freely within the housings 10 and the cover 16, in response to the turning of the ring gear 28.

The differential case 30 is provided with a pair of aligned bores 38 and 39 in which a shaft 40 is supported. A pair of spaced-apart compensating pinions 42 and 44 are rotatably mounted on the shaft 40. The outer surfaces of the compensating pinions 42 and 44 are shaped to conform to the corresponding surfaces of the differential case 30. A stop block 46, having an aperture 47, is mounted on the shaft 40 between the pinions 42 and 44.

The axle 14 leading to one of the wheels of the vehicle is aligned with a bore 48 in the differential case 30, and extends inwardly of the differential case 30 with the end surface 50 of the axle, adjacent the stop block 46. A portion near the inner end of the axle 14 is provided with external threads 53, and a bevel gear 54, which is provided with corresponding internal threads, is mounted on the threads. The bevel gear 54 is freely rotatable on the axle 14, but its travel along the axle 14 is limited in both directions, as described hereinafter. The axle 14' on the other side of the differential is provided with an identical bevel gear 54', and an identical threaded connection between the end portion of the axle 14' and its corresponding bevel gear 54'. The threads 53' on the axle 14' wind oppositely about the axle 14' from the threads 53 on the axle 14. The pitch of the threads 53 and 53' is between 10° and 20°, and is preferably about 14½°. As the differential case 30 rotates, the pinions 42 and 44 tend to rotate the bevel gears 54 and 54' so as to cause them to move outwardly on their respective axles 14 and 14' when the transmission is being powered in a forward direction. Similarly, when the motion is in the reverse direction, the pinions 42 and 44 rotate in the opposite direction and screw the bevel gears 54 and 54' inwardly on their respective axles. A pair of thrust washers 52 are mounted within the case 30, and the outer surface of the bevel gears 54 and 54' engages these washers 52, and slides on them as the axles 14 and 14' are rotated.

The shaft 14 is provided with an annular groove 55 adjacent the inner end thereof, but spaced from the end surface 50 thereof, to define a button-like member 57 at the extreme inner end of the axle 14. A C-ring 56 engages the groove 55 of the axle 14 and extends outward beyond the threads 53. The front face of each of the bevel gears is counterbored to provide an annular shoulder which bears against the C-ring 56 when the bevel gear 54 is rotated inwardly on the threads 53 of the axle 14, thus to limit the inward travel of the bevel gear 54. A plan view of the C-ring 56 is illustrated in FIG. 3. The length of the counterbore is slightly greater than the combined width of the groove 55 and the button 57 so that the inner face of the bevel gear 54, which faces toward the stop block 46, may project slightly beyond the end surface 50.

The case 30 is also provided with a counterbore 58 coaxial with the bore 48, and a collar 60 is disposed on the shaft 14 by means of set screws 61 disposed in bores 63, illustrated in FIG. 2. The set screws 61 may be set, through a bore 63 provided in the case 30. The collar 60 is adapted to bear against the face 65, at the end of the counterbore 58, to hold the axle 14 inwardly with respect to the differential, and to limit the outward movement of the bevel gear 54 on the shaft 14. Thus, the combination of the C-ring 56 at the inner end of the threads 53, and the collar 60 at the outer end of the threads 53, confines the travel of the bevel gear 54 relative to the axle 14 in both directions.

The construction and arrangement of the corresponding parts associated with the other axle 14' is identical with those which have been described above in connection with the axle 14.

The stop block 46 as shown in FIG. 1 is disposed between the two pinions 42 and 44, and also between the inner ends of the axles 14 and 14'. The stop block 46 is free to assume any position within the confines of these four members, and the shaft 40, which extends through the aperture 47, confines the stop block in the third orthogonal direction. The stop block 46 is dimensioned only slightly smaller than the space in which it is disposed, and therefore assumes the general position illustrated in FIG. 1. The diameter of the aperture 47 is larger than the diameter of the shaft 40, so that the movement of the stop block 46 in a left-and-right direction, as viewed in FIG. 1, is not impeded by the shaft 40.

In operation, when the vehicle is being propelled in a forward direction, the inner ends of the axles 14 and 14' are both urged against opposite sides of the stop block 46, by virtue of the case 30 being rotated by the application of power through the propeller shaft 22. The pinions 42 and 44 rotate about an axis coaxial with the axes of the axles 14 and 14', and turn the bevel gears 54 and 54' on their respective threads until the outer faces 66 and 66' of the bevel gears 54 and 54' are urged against the corresponding surface of the thrust washers 52. The inner ends of the axles 14 and 14' are tightly urged against the stop block 46. The friction between the inner ends of the two axles and the stop block 46, and between the bevel gears 54 and 54' and the thrust washers 52, is sufficient to maintain the axles locked together.

When the condition of the transmission is such that the vehicle is being propelled in reverse, the axles 14 and 14' screw outwardly until the outer faces of the collars 60 and 60' bear against the surface 65 of the counterbore 58 in the case 30. The friction therebetween locks the axles 14 and 14' together when in reverse. The bevel gears 54 and 54' simultaneously screw inwardly.

When the differential is differentiating, as, for example, when the vehicle is rounding a corner, traveling forward, so that the axle 14 rotates at a faster rate than axle 14', the faster moving axle 14 tends to screw itself out of its bevel gear 54, until its C-ring 56 engages the counterbore shoulder of the bevel gear 54, when the outward motion of the faster moving axle 14 is halted. This frees the inner end surface 50 of the faster moving axle 14 from engagement with the stop block 46 and permits free wheeling of the wheel on this axle. Meanwhile, the slower moving axle 14' tends to screw itself inwardly, toward the stop block 46, and does so until its collar 60' comes into engagement with the outer face of the hub of the bevel gear 54'. The spacing between the collar 60' and the hub of the bevel gear 54', when the differential is in its forward, non-differentiating condition, is less than the spacing between the counterbore shoulder of the bevel gear 54 and the outer surface of the C-ring 56, and also less than the spacing between the stop block 46 and the inner face of the bevel gear 54, so that the lock formed by the stop block 46 is released, permitting normal differentiation between the two axles 14 and 14'. The stop block 46 moves toward the withdrawing end of the faster running axle, and the slower running axle cannot maintain frictional contact with the stop block 46. The same condition is reached when the vehicle rounds a corner while traveling in reverse.

When the differentiating is stopped, as the two axles resume the same rate of angular rotation, the two axles 14 and 14' again become locked. The same effect occurs, of course, irrespective of which of the axles is the faster.

When the vehicle in which the differential of the present invention is employed is in a situation where one of the wheel axles 14 and 14' loses traction, the locking aspect of the differential is the same as when the differential is in the normal driving condition. For example, if the axle 14 is connected to the wheel which has less traction than the other one, due to its wheel being on mud, ice or the like, the axle 14 would receive most of the torque in an ordinary differential. In the differential of the present invention, however, (in forward drive) the compensating pinions 42 and 44 force both of the axles 14 and 14' inwardly until their ends bear on the stop block 46. In this condition the friction resulting from relative movement between the axles 14 and 14' and the stop block 46 opposes a difference in angular velocity of these two components, thus tending to make the stop block 46 and both the axles 14 and 14' rotate together, which in turn tends to equalize the torque applied to the two axles, irrespective of which axle has the greater traction.

When the vehicle is being driven in its reverse direction, the operation is the same except that in this case the friction between the collars 60 and 60' and the surfaces 65 and 65' furnishes the needed resistance to equalize the torque.

The differential of the present invention may be employed in a vehicle which accomplishes turning by braking one or the other of the axles 14 and 14'. In this case, after the lock between the axles is released by starting a turn, the slower, inside axle may be braked to complete the turn.

It will be noted that in the operation of the invention the locking torque is created by the frictional resistance between the stop block 46 and the inner ends of the axles 14 and 14', and between the bevel gears 54 and 54' and the thrust washers 52 (in forward drive) and between the collars 60 and 60' and the surfaces 65 and 65' (in reverse drive). Although it is contemplated that the materials of which all of these components are composed are sufficiently hard that none of these components would wear out during the normal life of the vehicle, it is within the scope of the present invention to form the stop block 46, the collars 60 and 60', and the thrust washers 52 of material which is slightly softer than the axles, the differential case 30, and the bevel gears, so that if any components need to be replaced, they will be the most conveniently replaceable ones. These components can be readily replaced in a vehicle by removing the cover 16 or the cover 19. Thus, the use of the differential of the present invention does not interfere with the enjoyment of the vehicle due to the necessity of frequent costly repairs.

If desired, bearings may be incorporated between the outer faces of the pinions 42 and 44 and the interior surface of the differential case 30.

It will be apparent to those skilled in the art that the present invention is readily adaptable to differentials of the ordinary type, it being necessary only to replace the ordinary splined connection between the axles and the corresponding bevel gears with the threaded connections of the present invention. In addition, it is necessary to install the stop block 46 and the collars 60 and 60'. These are modifications that may easily be made, merely by changing the machining steps involved in processing the axles and bevel gears, and installing the collars 60 and 60' and the stop block 46 during the assembly of the vehicle. The bevel gears 54 and 54' do not need to be any larger in diameter, for the threaded connection of the present invention, than they do for the conventional splined connection. In incorporating the present invention with an ordinary differential it is, therefore, not necessary to increase the size of the bevel gears, or of any other components of the differential.

Referring now to FIG. 4, a second embodiment of the present invention is illustrated. In FIG. 4, the housings 10 and 16 have not been illustrated, but the same housings as illustrated in FIG. 1 may be used. In addition, the bearings between the housing and the case, and the bearings for the propeller shaft 22, have also been omitted from the illustration of FIG. 4.

The apparatus of FIG. 4 includes a differential case 80 with a ring gear 28, a driving pinion 26, and a pair of axles 82 and 82' journalled in bores 84 and 84' within the case 80. The axles 82 and 82' are identical, and so a detailed explanation of one will suffice for both. The axle 82 is provided with an enlargement 81, and threads 83 are provided on the axle 82 inwardly of the enlargement 81. A shoulder 86 is formed at the inner end of the enlargement 81, and the threads 83 have their outward ends adjacent the shoulder 86. The inner ends of the threads 83 terminate at a shoulder 88, and a reduced diameter neck portion 90 of the axle extends inwardly beyond the shoulder 88 and terminates in an enlarged flange 92 which has an inclined or cut-back outside surface 91. The inside surface 93 of the flange 92 is plane, and adapted to engage the corresponding surface of the flange on the axle 82'.

A pair of semi-cylindrical clamp members 94, one of which is shown in FIG. 6, in perspective, and in combination with the axle 82, are disposed in locking engagement surrounding the neck 90. Each clamp member 94 has a groove milled in its inside surface, with the side edges of the groove 95 being at the same angle as the surface 91 to cooperate therewith. The clamp members 94 surround the flanges 92 of both of the axles 82 and 82' and restrain the axles 82 and 82' from moving outwardly relative to the case 80. The two clamp members 94 are connected together by screws disposed in aligned, threaded apertures 97 in the clamp members 94.

Bevel gears 100 and 100' are disposed on the threads of the shafts 82 and 82', and their hubs are limited in their outward travel on their respective shafts by the shoulders 86 and 86', and limited in their inward travel by the end wall 104 of the collar 94. Thrust washers 99 are disposed within the case 80 and cooperate with the outer surface of the bevel gears 100 and 100'.

A pair of shafts 106 and 108, supporting pinions 107 and 109 are disposed in the case 80, and their inner ends are held in position by brackets 110 and 112.

Figure 5:
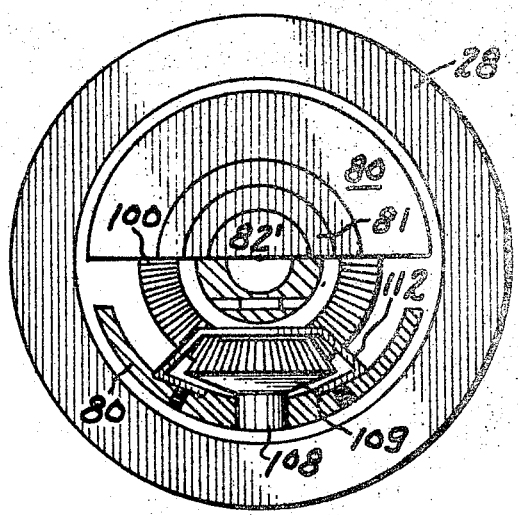
FIG. 5 is a vertical cross-sectional view of a portion of the apparatus illustrated in FIG. 4 taken along a section line 5—5.

The brackets 110 and 112 are secured to the interior of the case 80 in the manner illustrated in FIG. 5, in which only the bracket 112 is shown. The bracket comprises a strip of metal or the like which is formed generally into five sides of a hexagon, as viewed in FIG. 5, and the two endmost sides are secured to the interior surface of the case 80 by screws 101, supported in aligned threaded bores in the case 80 and the ends of the bracket 112.

When the differential is in its forward condition, the case 80 is rotated relative to the axles 82 and 82', by action of the ring gear 28, the pinion 26 and the propeller shaft 22, until the inner ends of the axles 82 and 82' are thrust together sufficiently so that their end surfaces 93 and 93' are in engagement. The friction therebetween locks the two axles 82 and 82' together so that both axles are driven with an equal amount of power. Meanwhile, the bevel gears 100 and 100' are urged outwardly relative to the casing 80 and engage the thrust washers 99, and the friction between these members contributes to the lock.

When the propeller shaft 22 is turning in the opposite direction, to drive the differential in the reverse condition, the axles 82 and 82' move outwardly slightly and are held by the clamp members 94. The friction between the cutback surfaces of the flanges 92 and 92' and the clamp members 94 is sufficient to lock these axles together in the reverse direction (the condition shown in FIG. 4). Meanwhile, the bevel gears 100 and 100' are rotated on the threads 83 until the inner end of each bevel gear is in engagement with the end surface 104 of the clamp members 94, and the friciton between these members contributes to the lock.

When the vehicle is differentiating, while traveling in reverse as illustrated in FIG. 4, the faster moving axle rotates relative to its bevel gear and tends to screw itself inwardly. If the axle 82 is the faster, it moves rightwardly as illustrated in FIG. 4, and releases the lock between its flange 92 and the clamp members 94. The slower moving axle 82' moves outwardly, urged by the pinion 26, until the outer surface of its bevel gear 100' contacts its thrust washer 99. The clamp members 94 are trapped between the flange 92' and the inner surface of the bevel gear 100'. The inward motion of the axle 82 continues until the shoulder 86 reaches the outer surface of the hub of the bevel gear 100.

The space between the opposing ends of the axles 82 and 82', when in reverse locked condition, is less than the space between the outer surface of the hub of the bevel gear 100 and the shoulder 86 on the axle 82, so that the lock remains released as long as differentiating continues. The same condition is reached when differentiating in a forward-going condition.

The differential illustrated in FIG. 4 functions similarly to that of FIG. 1 when one wheel of the vehicle loses traction. For example, if the transmission is such as to drive the differential forward, the opposite axles are moved inwardly sufficiently, by their corresponding bevel gears 100 and 100' to cause the inner surfaces 93 and 93' of the axles 82 and 82' to engage and become locked together.

Similarly, when the transmission is in reverse condition, the axles 82 and 82' are moved outwardly until the flanges 92 and 92' engage opposite edges of the groove 95 in the clamp member 94, and thereby become locked together. The differential of FIG. 4 operates, similarly to that of FIG. 1, to effect turning by braking one axle. The embodiment of FIG. 4, like that of FIG. 1, may be constructed by making appropriate modifications in an ordinary spider differential.

It will be understood that in the foregoing description, although the operation of the embodiment of FIG. 1 has been described for forward differentiating, and that of the embodiment of FIG. 4 has been described for reverse differentiating, both embodiments operate to allow differentiating in either forward or reverse. In addition, some of the spaces between various components in both embodiments have been exaggerated for clarity, and it is to be understood that spaces of only a few thousandths of an inch may be desired, to minimize the relative motion of the various parts of the mechanism.

It will be understood that some of these spaces are critical and must be properly dimensioned relative to each other to allow successful operation of the differential. For example, in the differential of FIG. 1, if, when differentiating in the forward condition, the collar 60 reaches the surface 65 before the C-ring 56 reaches the surface of the counterbore in the bevel gear 54, the lock will be resumed, which is an undesirable mode of operation.

In the embodiment of FIG. 1, the critical dimensions are as follows, it being understood that both sides are symmetrical. The dimensions refer to those obtaining in the locked, forward drive condition, as illustrated in FIG. 1.

Let:

A equal the distance between the outer surface of the C-ring 56 and the inner surface of the counter bore of the bevel gear 54, B equal the distance between the outer surface of the hub of the bevel gear 54 and the inner surface of the collar 60, C equal the distance between the outer surface of the collar 60 and the surface 65, and D equal the distance between the surface of the stop block 46 and the inner surface of the bevel gear 54.

The necessary relations of these dimensions are that A must be larger than C; C must be larger than B; and the sum of C and D must be larger than the sum of A and B.

These dimensional relations are predicated upon the assumption that the bevel gears can move inwardly on their axles, when the differential is being driven in its reverse condition. If, on the other hand, the arrangement is such that the bevel gears do not move in a direction parallel to the axes of the axles, the third required relation referred to above can be relaxed, and it is sufficient that D is greater than B, even though the relation as specified above is not met.

In the embodiment of FIG. 4, the critical dimensions are as follows, it being understood that both sides are symmetrical. The dimensions refer to those obtaining in the locked, reverse drive condition, as illustrated in FIG. 4.

Let:

A equal the distance between the shoulder 86 and the outer surface of the hub of the bevel gear 100, B equal the sum of the distance between the thrust washer 99 and the outer surface of the bevel gear 100, and the distance between the surface 104 of the clamp members 94 and the inner surface of the bevel gear 100, C equal the distance between the end surfaces 93 and 93' of the axles 82 and 82', and D equal the distance between the surface 104 of the clamp members 94 and the shoulder 88.

The necessary relations of these dimensions are that A must be larger than B; C must be larger than the difference between A and B; D must be larger than the difference between A and B; and D must be larger than one half of C.

The above dimensional relations hold for the embodiment of FIG. 4, irrespective of whether or not the bevel gears are restrained from moving inwardly during reverse drive. If the bevel gears are so restrained, substantially all of the dimension B is between the surface 104 of the clamp members 94 and the inner surface of the bevel gear.

By the foregoing, the present invention has been described in such detail as to enable others skilled in the art to make and use the same and, by applying current knowledge, to adapt the same for use under a variety of conditions of service without departing from the essential features of novelty thereof, which are intended to be defined and secured by the appending claims.

What is claimed is:

1. A differential comprising a differential case, said differential case having a shaft supported for rotation thereon, said shaft carrying compensating pinions, and a pair of bevel gears disposed within said differential case and meshing with said pinions; means for rotating said differential case, a pair of axles, each having a portion near its inner end associated with one of said bevel gears, said axles having helical threads on their said portions, and said bevel gears having corresponding internal threads cooperating with threads on said axle to permit said axles and bevel gears to move inwardly and outwardly, in relation to each other, in response to thrust imparted from said pinion, means for limiting lateral motion of said bevel gears on said axles in an inward direction, and an abutment fixed on each axle outwardly of its bevel gear for intercepting and limiting lateral motion of said bevel gears on said axles in an outward direction.

2. Apparatus according to claim 1, including a stop block disposed between the inner ends of said axles for limiting the inward lateral motion of said axles.

3. Apparatus according to claim 1, including a collar secured to each of said axles, and bearing means disposed in fixed relation outwardly of said collars to substantially prevent said axles from moving outwardly in an axial direction.

4. Apparatus according to claim 1, wherein said stop block is formed of material softer than that of the axles and bevel gears, so that substantially all of the wear resulting from friction between said stop block and said axles is taken by said stop block.

5. Apparatus according to claim 1, including a pair of surfaces on said differential case, parallel to and spaced outwardly from said bevel gears, to substantially prevent said bevel gears from moving outwardly on said axles relative to said differential case more than a predetermined distance.

6. Apparatus according to claim 1, wherein each axle has a peripheral groove intermediate said inner end portion and the inner end of said axle, and a pair of C-rings, said C-rings being disposed in said grooves to substantially prevent said bevel gears from moving inwardly on said axles more than a predetermined distance.

7. Apparatus according to claim 1, wherein the inner ends of said axles are adapted to engage each other, to substantially prevent movement of said axles relative to said differential case by more than a predetermined distance.

8. Apparatus according to claim 1, wherein each of said axles has a neck portion of reduced diameter interposed between said inner end portion and the inner end of said axle, and a transversely extending flange interposed between said neck portion and said inner end of said axle, and including clamp means surrounding said flanges for substantially preventing relative outward movement of said two axles by more than a predetermined distance.

9. Apparatus according to claim 8, wherein said clamp means comprises a pair of semi-cylindrical members, each of said members having an internal peripheral groove for receiving said flanges.

10. Apparatus according to claim 9, wherein the outer surfaces of said flanges mate with the side surfaces of said grooves.

11. Apparatus according to claim 1, including a stop block interposed between the inner ends of said axles, a C-ring mounted on each axle inwardly of said bevel gear, a collar mounted on each axle outwardly of said bevel gear, and stop means disposed outwardly of said collar for limiting the outward movement of said axle.

12. Apparatus according to claim 11, wherein $$A>C>B \text{ and } D>B$$

where A is the distance between each said bevel gear and the C-ring on its axle, B is the distance between each said bevel gear and the collar on its axle, C is the distance between each said collar and its respective stop means, and D is the distance between each said bevel gear and said stop block, all of said dimensions obtaining when the separation of said axles is a minimum and the separation of said bevel gears is a maximum.

13. Apparatus according to claim 12, wherein $$C+D>A+B$$

14. Apparatus according to claim 1, wherein each said axle is provided with an annular groove intermediate said threaded portion and its inner end, clamp means having claws cooperating with said grooves in both said axles for limiting their relative outward motion, said clamp means having a pair of end surfaces for limiting the inward motion of said bevel gears on each said axle, a pair of bearing members, one mounted on said case outwardly of each said bevel gear, a pair of stop means, one disposed on each axle outwardly of each said bevel gear.

15. Apparatus according to claim 14, wherein $A>B$, $C>A-B$, $D>A-B$, and $2D>C$; where A is the distance between each said bevel gear and its respective stop means; B is the sum of the distance between each said bevel gear and its respective bearing member, and the distance between each said bevel gear and its respective end surface of said clamp means; C is the distance between the inner ends of said axles; and D is the distance between each end surface of said clamp member, and the outer edge of said groove in its respective axle; all of said dimensions obtaining when the separation of said axles is a maximum.

References Cited

UNITED STATES PATENTS

| | | | |
|---|---|---|---|
| 2,861,477 | 11/1958 | Mueller | 74—711 |
| 2,923,174 | 2/1960 | Gleasman | 74—711 |
| 2,945,400 | 7/1960 | Dupras | 74—711 |
| 3,008,350 | 11/1961 | Misener | 74—710.5 |
| 3,027,781 | 4/1962 | O'Brien | 74—711 |
| 3,052,137 | 9/1962 | Russell | 74—710.5 |
| 3,224,299 | 12/1965 | Holdeman et al. | 74—711 |
| 3,310,999 | 3/1967 | Griffith | 74—710 |
| 3,330,169 | 7/1967 | Carrico et al. | 74—711 |

FRED C. MATTERN, *Primary Examiner.*

ARTHUR T. McKEON, *Assistant Examiner.*